United States Patent [19]

Lehmann

[11] 4,198,905
[45] Apr. 22, 1980

[54] CALENDER COMPOSED OF CONTROLLED DEFLECTION ROLLS

[75] Inventor: Rolf Lehmann, Rudolfstetten, Switzerland

[73] Assignee: Escher Wyss Aktiengesellschaft, Zürich, Switzerland

[21] Appl. No.: 10,920

[22] Filed: Feb. 9, 1979

[30] Foreign Application Priority Data

Mar. 1, 1978 [CH] Switzerland .................... 2197/78

[51] Int. Cl.² ................. B30B 3/04; B21B 13/02
[52] U.S. Cl. ..................... 100/162 B; 29/116 AD
[58] Field of Search ............ 100/162 B, 163 R, 163 A, 100/164, 170; 29/113 AD, 115, 116 AD

[56] References Cited

U.S. PATENT DOCUMENTS

| | | | |
|---|---|---|---|
| 3,885,283 | 5/1975 | Biondetti | 29/116 AD |
| 3,997,952 | 12/1976 | Lehmann | 29/115 |
| 4,023,480 | 5/1977 | Biondetti | 100/162 B |
| 4,074,624 | 2/1978 | Biornstad | 100/170 |
| 4,090,282 | 5/1978 | Lehmann | 29/116 AD |
| 4,106,405 | 8/1978 | Biondetti | 100/162 B |
| 4,154,160 | 5/1979 | Küsters | 100/162 B |

Primary Examiner—Edward J. McCarthy
Attorney, Agent, or Firm—Werner W. Kleeman

[57] ABSTRACT

A calender for processing pulverulent and doughy materials, composed of hydrostatic controlled deflection rolls. Each of the controlled deflection rolls comprises a roll shell rotatable about a stationary support member and hydrostatic support elements which can be activated by a pressurized fluid medium. The hydrostatic support elements of the rolls which coact at a pressure gap or nip, with the same elevational arrangement of such rolls, receive pressurized medium at the same pressure. If the rolls are located at an elevational difference then there is provided a differential pressure regulator for taking into account the effect of the inherent weight of the roll shells. The width over which the rolls can be impinged with the pressurized fluid medium can be adjusted, and equally the temperature of the pressurized fluid medium. The calender can be equipped with four rolls arranged in a substantially Z-shaped configuration.

8 Claims, 4 Drawing Figures

CALENDER COMPOSED OF CONTROLLED DEFLECTION ROLLS

BACKGROUND OF THE INVENTION

The present invention relates to a new and improved construction of calender composed of controlled deflection rolls—also sometimes referred to in the art as rolls with bending compensation—wherein each controlled deflection roll comprises a roll shell which is rotatable about a stationary support member or support. Between the roll shell and the support there are arranged punch-like or piston-like hydrostatic support elements. These hydrostatic support elements are pressed against the inner surface of the roll shell due to the effect of the hydrostatic pressure of a pressurized fluid medium which is effective in a pressure chamber. The support elements have contact surfaces and hydrostatic bearing pockets.

A calender or rolling mill, composed exclusively of controlled deflection rolls, has been taught to the art, for instance, in U.S. Pat. No. 3,997,952. The therein employed controlled deflection rolls can be, for instance, designed according to the teachings of U.S. Pat. No. 3,802,044 and U.S. Pat. No. 3,885,283. The controlled deflection rolls of such type, and which have been found in practice to be extremely advantageous, permit extensively compensating the sag or bending-through of the rolls during operation, the construction of wider calenders than heretofore possible in consideration of the sag of the rolls, and furthermore, the use of rolls having small external diameters.

SUMMARY OF THE INVENTION

It is a primary object of the present invention to improve upon the heretofore calender or rolling mill, and specifically, to devise a calender which satisfies the most extreme demands concerning uniformity of the line pressure between neighboring rolls, and thus, can be beneficially employed in the most different fields of application, both for simple calendering or rolling as well as also for grinding or processing of pulverulent or doughy materials, such as for instance foodstuffs, dye pigments or plastics.

Yet a further significant object of the present invention aims at the provision of a new and improved construction of calender or rolling mill composed of controlled deflection rolls wherein the calender is designed such that it is possible to effectively control, as desired, the pressure conditions prevailing at the contact gap or nip between neighboring coacting rolls of the calender.

Another object of the present invention aims at the provision of a new and improved construction of calender composed of controlled deflection rolls, which is relatively simple in construction and design, extremely reliable in operation, economical to manufacture, not readily subject to breakdown and malfunction, requires a minimum of maintenance and servicing and allows for extensively controlling the pressure or contact conditions prevailing at the pressure gap or nip of coacting rolls.

Now in order to implement these and still further objects of the invention, which will become more readily apparent as the description proceeds, the calender of the present development is manifested by the features that the support elements of the controlled deflection rolls located to both sides of a pressure gap or nip of two neighboring rolls are connected to a common source of pressurized fluid medium having independently adjustable pressure. With an arrangement of neighboring rolls forming a pressure gap or nip at the same height the infeed lines to the support elements of both such rolls located at the same height possess the same pressure. With an arrangement of the rolls at different heights there is provided a differential pressure regulator at the infeed line of the higher situated roll in order to form a pressure which is lowered by an essentially constant pressure difference and for compensating the effect of the inherent weight of the roll shells which coact to form the pressure gap.

By virtue of these measures there is beneficially realized an essentially completely, uniform contact force between each two neighboring rolls, and there are obtained particularly accurate working results in a manner as not heretofore possible with conventional calenders.

The controlled deflections rolls can be preferably equipped with means or devices for adjusting the axial extent of the region of the support elements impinged with the pressurized fluid medium. By virtue of such measure there is also then realized the strived for accuracy of the line pressure at the gap between two rolls, even then when the calender, as is often the case, does not have material to be processed over the entire length of its rolls. The contact force can be advantageously limited to only that region of the roll length which is occupied by the material to be processed.

Further, the infeed lines or infeed means for the pressurized medium can be equipped with means for independently influencing the temperature of the medium which is infed to the individual controlled deflection rolls. This measure allows for individually adjusting the temperature of the individual rolls, something which is advantageous for many fields of application of the calender, for instance during processing of chocolate.

One of both of the controlled deflection rolls forming the inlet or pressure gap can comprise a roll shell which is rotatably mounted upon the support of the roll by means of a radial bearing arrangement, whereas the other roll can contain a roll shell which is movable, in relation to the support, in the radial direction of the roll shell. The controlled deflection roll provided with the radial bearings thus forms a fixed support location against which there can be pressed the roll having the movable roll shell.

A preferred constructional embodiment of the inventive calender or rolling mill contemplates providing four controlled deflection rolls arranged in a substantially Z-shaped configuration. The front roll of the two rolls forming the inlet gap has a row of support elements and a roll shell which is rotatably mounted at the support in radial bearings. The second roll which coacts with the front roll possesses a radially freely movable roll shell having two rows of hydrostatic support elements. The third roll, coacting with the second roll, comprises a roll shell which is likewise rotatably mounted at its support in radial bearings and has two rows of support elements. The fourth roll, coacting with the third roll, is provided with a single row of hydrostatic support elements and has a roll shell which is guided at its support in the pressure direction.

Such type constructed calender or rolling mill is mechanically particularly simple, notwithstanding its theoretically and practically faultless optimum mode of operation. However, it should be understood that also different arrangements of the rolls are possible, for instance all of the rolls can be arranged such that their axes are located in a horizontal or a vertical plane.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
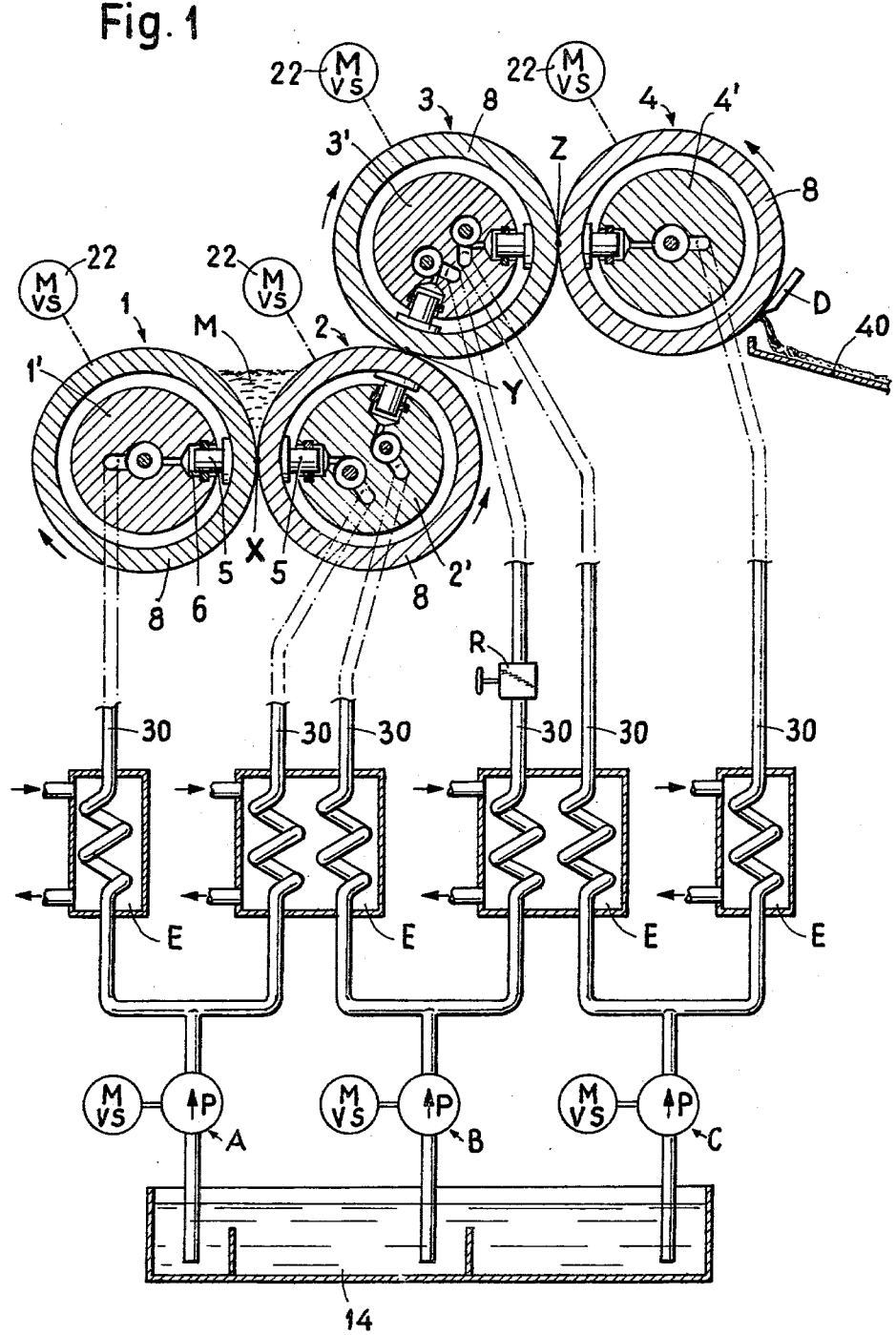
FIG. 1 is a schematic illustration of a calender, constructed according to the invention, containing controlled deflection rolls shown in sectional view substantially along the line I—I of FIG. 3.

Describing now the drawings, the invention will be explained in conjunction with a calender or rolling mill which is particularly suitable for processing cocoa powder for the fabrication of chocolate. Yet, it is to be specifically understood that the calender can be used in other fields of application as will suggest itself to those skilled in the art. With the present day calenders which are employed for chocolate fabrication purposes, it is practically impossible to maintain the grain size of the ground powder within a range of 15 to 25 microns. Sizes above 30 microns, already if present in an amount of 5%, impart to the chocolate a sandy taste, while grain sizes below 10 microns tend to bind a great deal of fat. Consequently, the produced chocolate is expensive and rich in calories. If it is possible to hold the boundaries of the grain sizes of the ground powder grains within narrow limits, so that the sandy taste is avoided, but on the other hand, the grains are still large enough so as not to bind too much fat, then there is obtained a low calorie chocolate, which additionally may be still less expensive, since there is saved on the expensive cocoa fat. Additionally, heretofore it was necessary to have different types of calenders with rolls of different camber or arching for the different grinding operations and cocoa material. On the other hand, the calender or rolling mill of the present development can be beneficially employed for all requirements which are generally encountered in practice.

As mentioned, the calender of the invention also can be used in other fields, such as for grinding pigments for paints and so forth.

The calender illustrated by way of example in the drawings will be seen to comprise controlled deflection rolls 1, 2, 3 and 4. Each of these controlled deflection rolls 1, 2, 3 and 4 contains one or two rows of punch-like or piston-like hydrostatic support elements 5 which are sealingly guided in bores 6 of the supports or support members 1', 2', 3' and 4' respectively, of such rolls. These supports 1', 2', 3' and 4' are supported in a frame or support arrangement 7 which has only been schematically indicated in FIG. 3, and such support members are prevented from rotating through the use of any suitable anti-rotating means as is will known in this art.

Rotatably arranged about the support members 1', 2', 3' and 4' are the roll shells 8 which are supported upon the related hydrostatic support elements 5. As best seen by referring to FIG. 3, where there has been illustrated in sectional view one of the support elements 5, these support elements 5 contain hydrostatic bearing pockets 5' which are connected by throttle channels or ducts 5" with the not particularly referenced pressure chamber or compartment formed by the related bore 6. In this way the hydrostatic support or pressure elements 5 are not only pressed against the inner surface of the related roll shell 8 by the hydraulic pressurized fluid medium which is effective in the bores 6, rather the pressurized fluid medium also reaches the bearing pockets 5', thereby forming a hydrostatic bearing or support between the support elements 5 and the related roll shell 8.

As concerns further details of such hydrostatic support arrangement reference may be had to the aforementioned U.S. Pat. No. 3,802,044, the disclosure of which is incorporated herein by reference.

Figure 2:
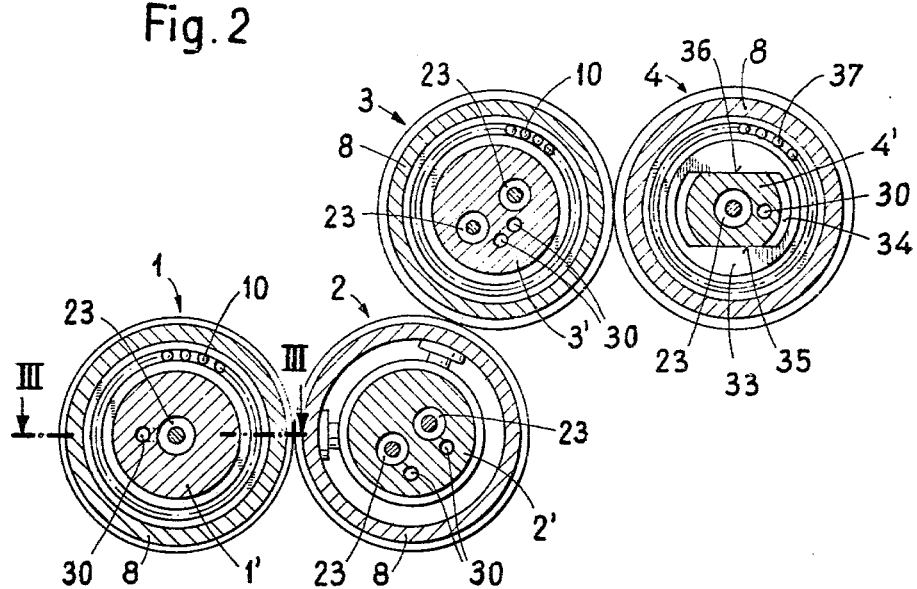
FIG. 2 is a sectional illustration of the controlled deflection rolls of the arrangement of FIG. 1, taken substantially along the line II—II of FIG. 3.

As particularly well seen by referring to FIG. 2, for the controlled deflection rolls 1 and 3 there is arranged between its roll shell 8 and its support or support member 1', at the ends of such roll shell, a respective roller bearing 10 which is effective primarily in radial direction. The intermediate space or compartment 11, located between the support 1' and the related roll shell 8, is closed at its ends by the sealing discs 12. From the intermediate space or compartment 11 of each such controlled deflection roll, there departs, by means of a channel 13 at the support 1', towards the outside, the hydraulic medium located in such intermediate compartment 11, this hydraulic medium normally being a mineral oil by way of example. The outflowing hydraulic medium is delivered by any suitable withdrawal or outflow line, only part of which for instance is shown at the right-hand side of FIG. 3, into a collecting container or receiver, for instance the collection container 14 shown in FIG. 1.

Figure 3:
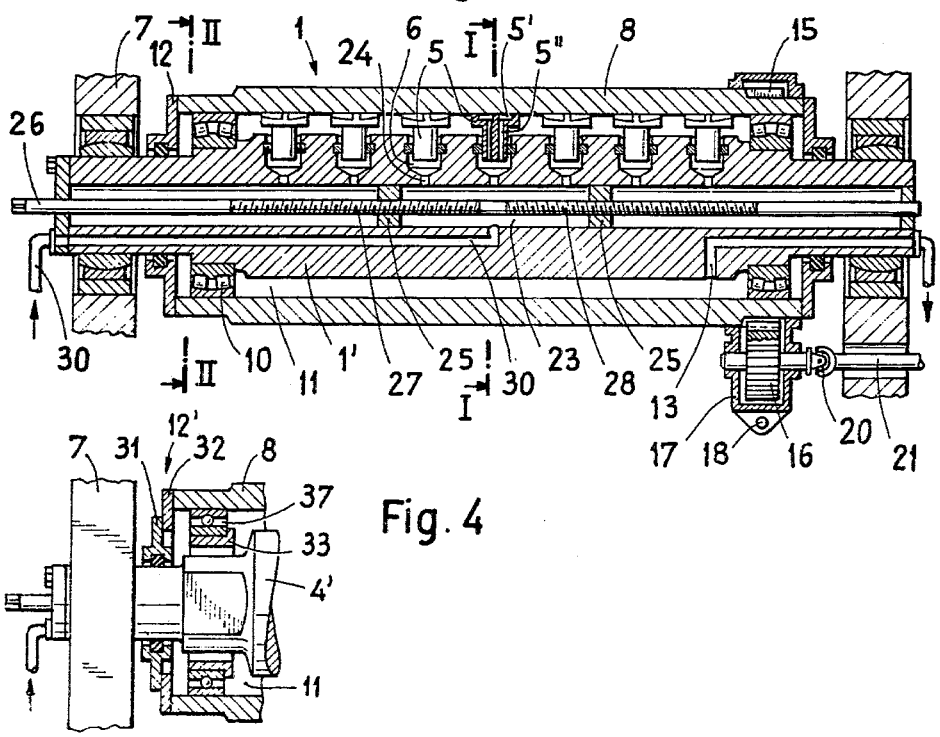
FIG. 3 is an axial sectional view of one of the controlled deflection rolls, taken substantially along the line III—III of FIG. 2.

As will be further apparent from the showing of FIG. 3, the roll shell 8 of the controlled deflection roll 1, and similarly the roll shells 8 of the remaining controlled deflection rolls 2, 3 and 4, are provided with a motor drive or drive means. For this purpose there is formed or provided at the right-hand end of the roll shell 8, shown in FIG. 3, a gear or tooth arrangement 15. Engaging with the gear 15 is a pinion 16 rotatably mounted in a housing 17 which encloses the roll shell 8 and is likewise rotatably mounted thereon. The housing 17 is prevented from rotating by a torque support 18 or equivalent structure, extending perpendicular to the plane of the drawing. Merging with the not particularly referenced shaft of the pinion 16, by means of a universal or Cardan joint 20 is a drive shaft 21 operatively connected with not particularly illustrated gearing or transmission means and a drive motor having variable rotational speed. The motor drives with variable rotational speed have only been schematically illustrated in FIG. 1 and generally designated by reference character 22.

As concerns the motor drive for the roll shell 8 of each controlled deflection roll, in this respect reference may be had to U.S. Pat. No. 4,000,979, where such type of drive has been disclosed in greater detail, and to which reference may be had and the disclosure of which is incorporated herein by reference. However, it should be specifically understood that also other known types of drives for the roll shells of controlled deflection rolls can be used in the arrangement of the invention.

Further, the sectional view of FIG. 3 shows a possibility for constructing the means or device for adjusting the axial extent of the region of the support elements 5 impinged by the pressurized fluid medium. For this purpose the support or support member 1' is provided with a distributor bore 23 from which connection bores 24 lead to the bores 6 of the individual support elements 5. There are sealingly guided two shutoff or blocking pistons 25 in the distributor bore 23. These shutoff or blocking pistons 25 can be positionally adjusted symmetrically with respect to a central position, by means of a thread rod 26 or the like having two threaded portions 27 and 28 with opposite pitch threads. Upon rotating the threaded rod 26 in one direction the two pistons 25 move towards one another, so that fewer connection bores 24 flow communicate with the chamber region or space between the pistons 25 and into which space there opens an infeed line or conduit 30 for the hydraulic pressurized fluid medium. Upon rotation of the threaded rod 26 in the opposite direction these pistons 25 move away from one another, so that as desired it is possible to supply a greater number of connection bores 24 with the pressurized fluid medium, and the related hydrostatic support elements 5 can be placed under pressure. On the other hand, the piston-like support elements 5 which are located externally of the pistons 25 are ineffectual.

Corresponding to the illustration of FIGS. 1 and 2 the controalled deflection roll 2 contains two rows of support elements 5 which, in the same manner as the controlled deflection roll 1, are supplied, in an adjustable fashion, with the pressurized fluid medium by means of the distributor bores 23 having the pistons 25 and infeed lines or conduits 30. Since the roll shell 8 of the controlled deflection roll 2, must be movable in relation to the roll shells 8 of the rolls 1 and 3, there are dispensed with the use of the roller bearings 10 for the controlled deflection roll 2, these roller bearings 10, as will be recalled, being provided for the controlled deflection rolls 1 and 3. In this case, however, the sealing plate 12 previously discussed is replaced at the controlled deflection roll 2 by a movable seal or sealing arrangement 12' allowing radial movements of the roll shell 8 in relation to the support 1'. The seal or sealing arrangement 12' comprises two mutually movable plates 31 and 32 which can be pressed against one another by any suitable and therefore not particularly illustrated elastic means. These plates 31 and 32 laterally close off the intermediate space or chamber 11. It should be understood that the construction of the sealing arrangement 12' has only been schematically shown, and that any other known type of lateral closure or seal means for the intermediate space or compartment 11 can be used at such location.

Figure 4:
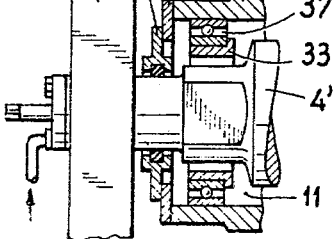
FIG. 4 is a partial sectional view, corresponding to the showing of FIG. 3, through an end of another one of the controlled deflection rolls.

The controlled deflection roll 4 differs from the controlled deflections rolls 1, 2 and 3 in that, it contains at its ends guide discs or plates 33 which are provided with elongate openings or holes 34 having essentially parallel, planar guide surfaces 35. The support 1' is provided at the locations of the guide discs or plates 33 with guide surfaces 36 which coact with the planar guide surfaces 35. The guide discs or plates 33, in this manner, ensure for a guided motion of the roll shell 8 of the controlled deflection roll 4 in the direction of the pressure or pressing plane, i.e., in the direction of movement of the hydraulic support elements 5. A controlled deflection roll of this type is particularly well disclosed in the already mentioned U.S. Pat. No. 3,885,283, to which reference may be readily had for further details and the disclosure of which is incorporated herein by reference. As will be further apparent from the showing of FIG. 2, the guide discs 12 located at both ends of the roll shell 8, are mounted therein in the roller bearings 37. Also this controlled deflection roll 4 can be provided at its ends with a respective seal or sealing arrangement 12' of the type shown in FIG. 4, in order to render possible the requisite movements of the roll shell in relation to the support 1'.

In accordance with the illustration of FIG. 1, the controlled deflection rolls 1, 2, 3 and 4 form with one another the pressure gaps or nips X, Y and Z. More particularly, the coacting and neighboring rolls 1 and 2 form the pressure gap X, the coacting and neighboring pressure rolls 2 and 3 the pressure gap Y, and finally, the coacting and neighboring rolls 3 and 4 the pressure gap Z. The support elements 5 located to both sides of the pressure gap X are connected at a common pump installation or unit A having a variable pressure, the support elements 5 located to both sides of the pressure gap Y are connected with a pump installation or unit B, and finally, the support elements 5 arranged to both sides of the pressure gap Z are connected with a pump installation or unit C. At the infeed lines or conduits 30, leading in each case to a related controlled deflection roll, there are arranged the heat exchangers E, as shown in FIG. 1, where the hydraulic medium which is infed to the related controlled deflection roll can be heated or cooled to a desired temperature, with the result that the roll shell 8 of the related roll likewise is heated or cooled.

As further apparent from FIG. 1 the confronting support elements 5 of the controlled deflection rolls 1 and 2, and which support elements influence the pressure gap or nip X have infed thereto the pressurized fluid medium from the pump installation or unit A at the same pressure. The same is true for the support elements 5 of the controlled deflection rolls 3 and 4 which effect the pressure gap Z. The controlled deflection rolls 1, 2 and 3, 4 are namely arranged in each case, as shown, at the same height or elevational position, so that the weight of the roll shells does not have any effect upon the pressure formed in the related gap.

On the other hand, this is not true for the pressure gap Y between the controlled deflection rolls 2 and 3 which are located at different elevational positions. Here, owing to the different elevational positions of the controlled deflection rolls 2 and 3 also the weight of the roll shells 8 has an effect upon the pressure gap Y between these rolls 2 and 3. Thus, the support elements 5 of the controlled deflection roll 2 and which confront the controlled deflection roll 3, must not only counteract the force of the support elements 5 of the roll 3 which confront the support elements 5 of the roll 2, but also the weight components of both roll shells 8 of the controlled deflection rolls 2 and 3. It should be apparent that the force of the support elements 5 of the controlled deflection roll 3, which is effective in the direction of such weight component, must be smaller by such amount. For this purpose there is incorporated into the related line or conduit 30 of the controlled deflection roll 3 a differential pressure regulator or pressure regulator means R. The function of this pressure regulator means R is to retain the pressure in the line where it is located, lower by an adjustable constant value, in relation to the other line or conduit 30 which is supplied by the same pump installation B. This constant value can be set such that it corresponds to the influence of the weight of both roll shells 8 and eliminates the same.

During operation, the calender or rolling device of FIGS. 1 to 4 can have infed thereto the material M which is to be processed, for instancd cocoa powder or paint pigment having a suitable binder in a doughy consistency or form. The material M during rotation of the controlled deflection rolls 1, 2, 3 and 4, moves in the direction of the illustrated components, in succession through the pressure gaps or nips X, Y and Z, and finally is scraped-off by a scraper or doctor blade D or equivalent structure into a container 40. When the rotational speed of coacting rolls is the same, then there is produced a simple rolling action. If such rotational speed of the coacting rolls is different then the material M can be ground or comminuted between such rolls. As a rule, the material M between the rolls 1 and 2 is only applied at a central region of such rolls and thereafter progressively spreads out between the rolls 3 and 4, so that the last-mentioned rolls 3 and 4 are contacted over a greater part of their lengths by the material. By appropriately adjusting the pistons 25 shown in FIG. 3, it is beneficially possible to regulate the pressure force such that it only is effective at the region of the controlled deflection rolls which is contacted by the material M. However, it should be understood that the region between the pistons 25 also can be adjusted to be the same at all of the rolls, and thus can extend over the entire roll length or only a part thereof. Thus, for instance, it is possible to process smaller material quantities only at a part of the calender.

The inventive combination of measures thus enables the realization of a calender or rolling mill which affords a precise grinding of the processed material, and thus, especially fulfills the heretofore non-attainable requirements of the chocolate manufacturing industry. Due to the elimination of the otherwise needed cambering or doming of the rolls, the inventive calender can be universely employed. The possibility of influencing the temperature of the rolls widens the field of application of the calender to additional fields of use of the foodstuff industry and industries producing luxury-type edible or consumable products, in order to carry out, for instance, at products, in conjunction with the demoistening at thin layers, controlled aroma-forming reactions.

While there are shown and described present preferred embodiments of the invention, it is to be distinctly understood that the invention is not limited thereto, but may be otherwise variously embodied and practiced within the scope of the following claims. Accordingly,

What I claim is:
1. A calender comprising:
   a plurality of controlled deflection rolls;
   each of said controlled deflection rolls comprising:
      a stationary support;
      a rotatable roll shell having an inner surface and mounted to be rotatable about said stationary support;
      a plurality of piston-like hydrostatic support elements located between the roll shell and said support;
      means defining a pressure chamber means for said support elements;
      means for infeeding a pressurized fluid medium to the hydrostatic support elements which, under the action of the hydrostatic pressure which is effective in said pressure chamber means, are pressed against the inner surface of the roll shell of the related controlled deflection roll;
   said plurality of controlled deflection rolls defining coacting neighboring controlled deflection rolls forming between each two neighboring coacting rolls a pressure gap;
   the support elements of each coacting two neighboring controlled deflection rolls to both sides of the formed pressure gap being connected with a common source for the pressurized fluid medium and having independently adjustable pressure;
   said common pressurized fluid medium source constituting at least part of said means for infeeding the pressurized fluid medium to the controlled deflection rolls;
   said plurality of controlled deflection rolls including an arrangement of two coacting neighboring controlled deflection rolls forming a pressure gap and located at the same height;
   said means for infeeding said pressurized fluid medium including infeed lines for the support elements of said two controlled deflection rolls at the same height;
   said infeed lines carrying essentially the same pressure of the pressurized fluid medium;
   said plurality of controlled deflection rolls including two controlled deflection rolls arranged at different elevational positions;
   said means for infeeding the pressurized fluid medium comprising infeed lines for the controlled deflection rolls at elevationally different positions;
   the infeed line of the highest situated controlled deflection roll being provided with pressure regulator means for forming a pressure which is lower by essentially a constant pressure differential and for compensating the effect of the inherent weight of the roll shells of the controlled deflection rolls forming the pressure gap of such controlled deflection rolls at elevationally different positions.
2. The calender as defined in claim 1, wherein:
   each of said hydrostatic support elements comprises contact surface means provided with hydrostatic bearing pockets.
3. The calender as defined in claim 1, further including:
   means provided for at least given ones of said controlled deflection rolls for adjusting the axial extent of the region of the support elements impinged with said pressurized fluid medium.
4. The calender as defined in claim 1, further including:
   means provided for the infeed lines for the pressurized fluid medium in order to independently influence the temperature of the pressurized fluid medium which is infed to the individual controlled deflection rolls.
5. The calender as defined in claim 1, wherein:
   said plurality of controlled deflection rolls include two controlled deflection rolls coacting with one another and forming an inlet gap;
   one of the two controlled deflection rolls forming the inlet gap having its roll shell rotatably mounted upon the related support of such controlled deflection roll by means of radial bearing means;
   the other roll or said two controlled deflection rolls forming the inlet gap having its roll shell movably mounted in relation to its support in the radial direction of said roll shell.

6. The calender as defined in claim 1, wherein:
said plurality of controlled deflection rolls comprise four controlled deflection rolls arranged in a substantially Z-shaped configuration;
said four controlled deflection rolls defining a first, forward controlled deflection roll, a second controlled deflection roll, a third controlled deflection roll and a fourth controlled deflection roll;
the first, forward controlled deflection roll and the second controlled deflection roll forming an inlet gap;
the first, forward controlled deflection roll having one row of said support elements and having its roll shell rotatably mounted in radial bearing means at said support;
the second controlled deflection roll coacting with the first controlled deflection roll;
said second controlled deflection roll having a radially freely movable roll shell and two rows of hydrostatic support elements;
the third controlled deflection roll coacting with the second controlled deflection roll;
said third deflection roll having its roll shell rotatably mounted at its support in radial bearing means;
said third controlled deflection roll having two rows of said support elements; and
said fourth controlled deflection roll having a single row of said hydrostatic support elements and its roll shell guided at its support in the direction of application of pressure by the fourth controlled deflection roll.

7. A calender comprising:
a plurality of controlled deflection rolls;
each of said controlled deflection rolls comprising:
a stationary support;
a rotatable roll shell having an inner surface and mounted to be rotatable about said stationary support;
a plurality of piston-like hydrostatic support elements located between the roll shell and said support;
means defining pressure chamber means for said support elements;
means for infeeding a pressurized fluid medium to the hydrostatic support elements which, under the action of the hydrostatic pressure which is effective in said pressure chamber means, are pressed against the inner surface of the roll shell of the related controlled deflection roll;
said plurality of controlled deflection rolls defining coacting neighboring controlled deflection rolls forming between each two neighboring coacting rolls a pressure gap;
the support elements of each coacting two neighboring controlled deflection rolls to both sides of the formed pressure gap being connected with a common source for the pressurized fluid medium and having independently adjustable pressure;
said common pressurized fluid medium source constituting at least part of said means for infeeding the pressurized fluid medium to the controlled deflection rolls;
said plurality of controlled deflection rolls when including an arrangement of two coacting neighboring controlled deflection rolls forming a pressure gap and located at the same height being provided with infeed lines for the support elements of said two controlled deflection rolls at the same height;
said infeed lines carrying essentially the same pressure of the pressurized fluid medium;
said plurality of controlled deflection rolls when including two controlled deflection rolls arranged at different elevational positions being provided with infeed lines for the controlled deflection rolls at elevationally different positions;
the infeed line of the highest situated controlled deflection roll being provided with pressure regulator means for forming a pressure condition in such infeed line which is lower by essentially a constrant pressure differential and for compensating the effect of the inherent weight of the roll shells of the controlled deflection rolls forming the pressure gap of such controlled deflection rolls at elevationally different positions.

8. A calender comprising:
a plurality of controlled deflection rolls;
each of said controlled deflection rolls comprising:
a stationary support;
a rotatable roll shell having an inner surface and mounted to be rotatable about said stationary support;
a plurality of piston-like hydrostatic support elements located between the roll shell and said support;
means defining pressure chamber means for said support elements;
means for infeeding a pressurized fluid medium to the hydrostatic support elements which, under the action of the hydrostatic pressure which is effective in said pressure chamber means, are pressed against the inner surface of the roll shell of the related controlled deflection roll;
said plurality of controlled deflection rolls defining coacting neighboring controlled deflection rolls forming between each two neighboring coacting rolls a pressure gap; and
the support elements of each coacting two neighboring controlled deflection rolls to both sides of the formed pressure gap being connected with a common source for the pressurized fluid medium and having independently adjustable pressure.

* * * * *